United States Patent [19]

Stampfli

[11] 4,074,699
[45] Feb. 21, 1978

[54] FLUID-ASSISTED ELECTROMAGNETIC CONTROL DEVICE

[75] Inventor: Harald Stampfli, Geneva, Switzerland

[73] Assignee: Lucifer S.A., Geneva, Switzerland

[21] Appl. No.: 676,414

[22] Filed: Apr. 13, 1976

[30] Foreign Application Priority Data

Apr. 29, 1975 Switzerland .................... 5513/75

[51] Int. Cl.$^2$ ............... F16K 31/365; F16K 31/40
[52] U.S. Cl. .......................... 137/625.64; 91/379; 251/30
[58] Field of Search ............. 137/85, 625.6–625.65; 91/376; 251/30

[56] References Cited

U.S. PATENT DOCUMENTS

| 2,434,538 | 1/1948 | Baston ................... 91/376 X |
| 2,898,936 | 8/1959 | Collins ................... 137/625.63 |
| 3,458,769 | 7/1969 | Stampfli ................. 137/625.64 X |
| 3,677,298 | 7/1972 | Greenwood ............. 137/625.64 |

FOREIGN PATENT DOCUMENTS 536,451  6/1973  Switzerland.

*Primary Examiner*—Robert G. Nilson
*Attorney, Agent, or Firm*—Emory L. Groff, Jr.

[57] ABSTRACT

A fluid-assisted electromagnetic valve comprises an element movable in a working chamber as a function of a fluid pressure differential applied by an electromagnetic control. The movable element has inlet and exhaust nozzles in the working chamber which are selectively obturated by respective spring-biased plungers mounted on an extension of a mobile core of the electromagnetic control, according to the direction of movement of the core, to provide the pressure differential. Said extension comes to bear directly against the respective nozzle to ensure movement of the element even when the pressure differential is insufficient.

4 Claims, 3 Drawing Figures

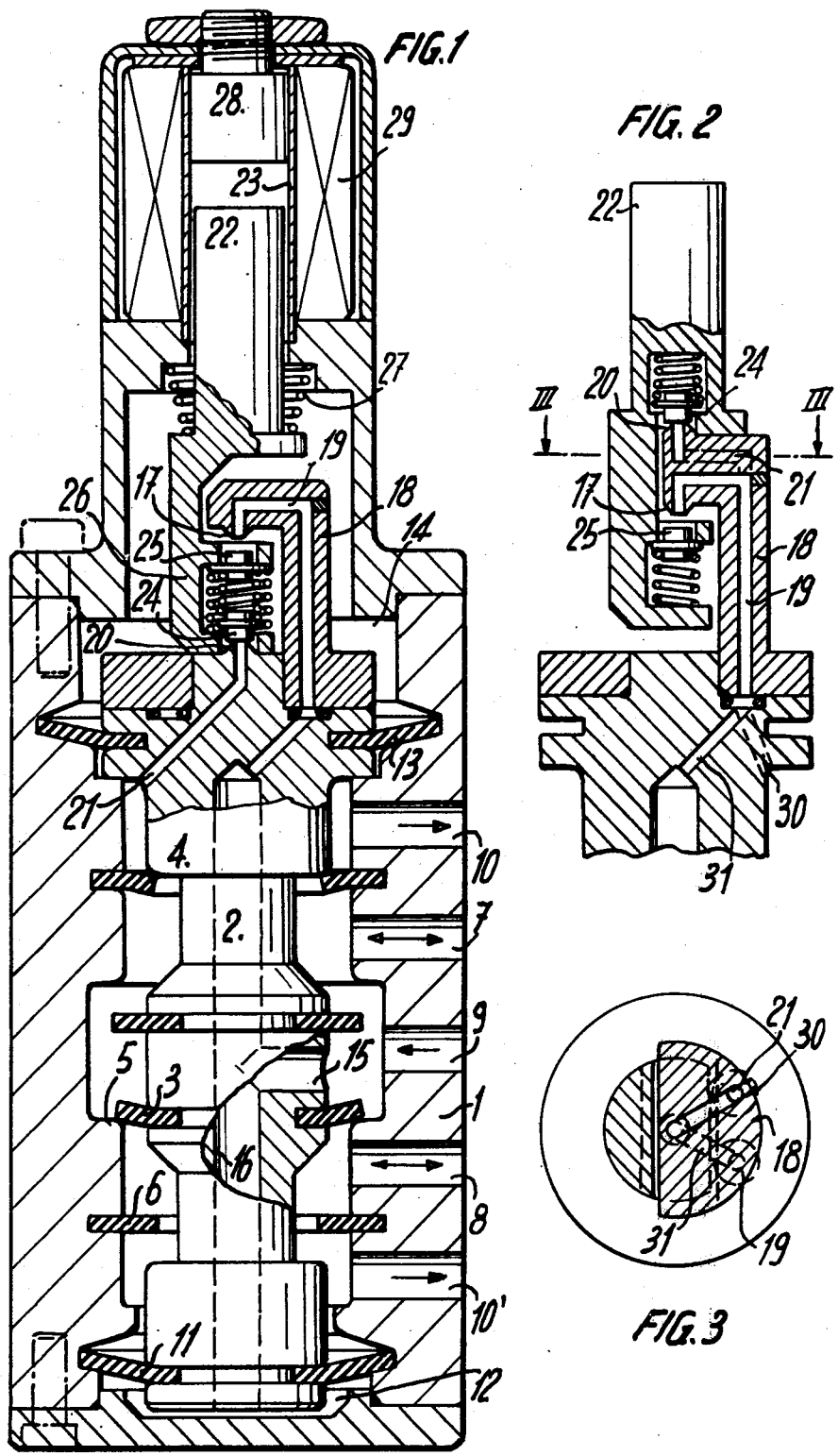

FLUID-ASSISTED ELECTROMAGNETIC CONTROL DEVICE

The invention relates to fluid-assisted electromagnetic control devices.

There are known fluid-assisted electromagnetic control devices comprising at least one working chamber with at least one element movable as a function of the pressure in this chamber, an inlet duct for fluid under pressure, an outlet duct for this fluid, and valves controlled by an electromagnetic device to produce the pressurization and exhaust respectively of this chamber to control displacements of the mobile element.

Also known are servo-controlled two-way valves in which displacement of a principal obturator is assisted in both directions by movement of the mobile armature of an electromagnet (U.S. Pat. No. 3,405,906 and 3,797,526). In these valves, the obturator is subjected to the inlet pressure of the fluid on its side opposite the seat, and the mobile armature controls an auxiliary orifice permitting communication between the chamber under pressure and the valve outlet. There is thus a principal passage and an auxiliary passage for the fluid when the valve is open.

Also known is a servo-controlled three-way valve in which displacement of the principal valve is assisted in one direction by the force of attraction of the servo-control electromagnet (Swiss Pat. No. 536,451).

The invention concerns a fluid-assisted electromagnetic control device which may be used in many industrial applications. In the case of a principal valve having at least three ways, it enables assistance of the servo-control, in both directions of displacement of the mobile element of the valve, by the mobile armature of the electromagnet. This is particularly interesting since such a valve may be actuated when idle, i.e. when the fluid it contains is not under pressure or, at least, is not subjected to a sufficient pressure to ensure servo-control.

According to the invention, there is provided a device of the type stated at the outset, in which the mobile element carries first and second nozzles associated with said fluid inlet and exhaust ducts respectively, said nozzles leading into a space communicating with or forming part of the working chamber, and an obturating member connected to a mobile armature of the electromagnetic device is arranged to obturate the first or second nozzle according to the direction of displacement of the mobile armature, the mobile armature having a part which comes to bear at the latest at the end of its displacement in either direction against the mobile element.

The accompanying drawings show, schematically and by way of example, an embodiment of the device according to the invention applied to a four-way valve, as well as a variation.

FIG. 1 is a cross-sectional view of said embodiment;
FIG. 2 is a cross-sectional view of a variation of this embodiment; and
FIG. 3 is a cross-section along line III—III of FIG. 2.

The valve shown in FIG. 1 comprises a hollow body 1 in which is movably mounted a movable valve member 2 provided, in known manner, with elastic joint rings 3 and shoulders 4 for cooperating with shoulders 5 and joint rings 6 of the body 1, in a manner to alternately place two outlet passages 7, 8 in communication either with an inlet 9 for fluid under pressure, or with an exhaust outlet 10 or 10'. The member 2 also has at its lower part a membrane 11 defining a chamber 12 and at its upper part a membrane 13 defining a chamber 14.

The chamber 12 is permanently supplied with fluid under pressure by the inlet 9 and bores 15 and 16 of member 2. To the contrary, the chamber 14 may be placed under pressure by means of a nozzle 17 extruding from a base portion situated at the end of a piece 18 on movable valve member 2 having a duct 19 communicating with bore 16. It can also be connected to the exhaust by means of a nozzle 20 which is connected by a duct 21 to the chamber communicating with the exhaust outlet 10.

The effective section of the chamber 12 is smaller than that of chamber 14 so that the member 2 moves downwards when the chamber 14 is under pressure, and upwards when it is connected to the exhaust. This placing under pressure and exhaust respectively is controlled by an electromagnetic device 22, 23, 28, 29 comprising a magnetic armature in the form of a core 22 slidably mounted in a tube 23 and carrying two valve plungers 24 and 25. These plungers are mounted between bore supports formed on an extension 26 of the core 22, which extension is offset to pass about the nozzle 17. A spring mounted between plungers 24 and 25 urges them to rest positions between the supports. The assembly 24, 25, 26 constitutes an obturating member for the nozzles 17 and 20. The core 22 is subjected to the action of a biasing spring 27 and may be moved against the action of spring 27 by providing a magnetic field through a fixed ferromagnetic core 28 surrounded by a winding 29.

When the core 22 is in the position illustrated in FIG. 1, under the action of spring 27, the plunger 24 obturates nozzle 20 whereas plunger 25 uncovers nozzle 17. In this manner, fluid under pressure is admitted to the chamber 14 and the pressure on membrane 13 and member 2 brings the latter into the illustrated position.

When an energizing current is delivered in the winding 29, the core 22 is pulled up towards core 28 so that nozzle 20 is uncovered and nozzle 17 closed. The chamber 14 is thus exhausted via duct 21 so that the pressure in chamber 12 moves member 2 up. It can be seen that this displacement takes place in the same direction as that of the magnetic core 22. Consequently, if the valve is empty of if the fluid pressure at inlet 9 is insignificant, so that the servo-control as a function of the pressure in chambers 12 and 14 is inefficient, the member 2 is nevertheless displaced by the magnetic core whose extension 26 engages with the piece 18 carrying nozzle 17. Likewise, when the energization current is cut, the spring 27 biases the core 22 downwards, and the core, by bearing of its extension 26 against the member 2, returns the latter into the illustrated position.

It can be seen that the member 2 does not rigorously follow displacements of the core 22, but driving by the latter only takes place after the idle path due to the clearance between the two plungers and their respective nozzles.

FIG. 2 illustrates a variation which differs from the described embodiment by the fact that the nozzles 17 and 20 of the obturating member are not disposed facing one another, but in opposite directions, and the obturating surfaces of plungers 25, 24 are disposed on either side of the nozzles 17, 20. However, the operation of this variation is in all respects analogous to that of the assisted—control device of FIG. 1.

In the case of FIGS. 2, the nozzles 17 and 20 are coaxial, and the ducts 21 and 19 are disposed side-by-side by providing bore sections 30 and 31 at an angle to one another, as shown in FIG. 3.

The described device is not necessarily applied to the control of a valve but may be used in other cases where a member is subjected to fluid control assisted by an electromagnetic control device.

I claim:

1. A fluid assisted electromagnetic control device comprising a hollow valve body, a movable valve element therein, an electromagnetic device having an armature mounted on said body, fluid pressure inlet, outlet and exhaust passages in said valve body, means on said movable valve element for controlling the flow of fluid under pressure to said inlet, outlet and exhaust passages, means on said movable valve element forming with the valve body a first working chamber at one end of said valve element and a second working chamber at the other end of said element, first nozzle means extending from a base on said movable valve element and extending into said first chamber and communicating with said exhaust passage, second nozzle means extending from a base on said movable valve element in said first chamber in alignment with and spaced from said first nozzle means and communicating with said pressure inlet passage, an obturating member connected with said armature comprising two spaced supports, two plungers on said supports and biased into engagement therewith, said plungers being in alignment with and adapted to obturate said nozzles alternately, whereby upon movement of said armature in either direction, a plunger will engage a nozzle and obturate it, and upon further movement, the plunger will yield and the plunger support will engage the nozzle base to positively move the valve element, and means permanently connecting said second working chamber with said pressure inlet passage.

2. A device according to claim 1, in which the movable valve element is movable along an axis, said nozzles facing one another and being coaxial along a line parallel to said axis, and said obturating member being disposed between said nozzles.

3. A device according to claim 1, in which the movable valve element is movable along an axis, said nozzles being coaxial along a line parallel to said axis and facing away from one another, and said plungers being disposed on either side of said nozzles.

4. A device according to claim 1, in which said nozzles are coaxial to the axis of displacement of the movable valve element, said obturating member being carried by the armature of the electromagnetic device, said armature being movable along the same axis.

* * * * *